United States Patent [19]

Konoike et al.

[11] Patent Number: 5,589,096
[45] Date of Patent: Dec. 31, 1996

[54] MAGNETIC MATERIAL FOR HIGH FREQUENCIES

[75] Inventors: Takehiro Konoike, Ashiya; Hiroshi Marusawa, Neyagawa; Hiroshi Takagi; Kunisaburo Tomono, both of Ohtsu, all of Japan

[73] Assignee: Murata Manufacturing Co., Ltd., Japan

[21] Appl. No.: 277,909

[22] Filed: Jul. 20, 1994

[30] Foreign Application Priority Data

Jul. 20, 1993 [JP] Japan .................................. 5-179150
Jun. 29, 1994 [JP] Japan .................................. 6-147958

[51] Int. Cl.$^6$ ............................................. C04B 35/44
[52] U.S. Cl. ............................ 252/62.57; 252/62.58
[58] Field of Search ............................ 252/62.57, 62.58

[56] References Cited

U.S. PATENT DOCUMENTS 3,563,897  2/1971  West ........................... 252/62.57
3,763,045  10/1973  Takamizawa et al. ........... 252/62.57

OTHER PUBLICATIONS

Patent Abstracts Of Japan, vol. 16, No. 347 (E–1240) 27 Jul. 1992 & JP–A–04 106 806 (Matsushita Electric Works) 8 Apr. 1991 –Abstract.
WPI Patent Abstract corresponding to JP–B 49–15754.

*Primary Examiner*—Melissa Bonner
*Attorney, Agent, or Firm*—Ostrolenk, Faber, Gerb & Soffen, LLP

[57] ABSTRACT

A magnetic material for high frequencies consists essentially of a main component expressed by the general formula:

$$(Y_{3-x-2z}Ca_{x+2z})(Fe_{w-x-y-z}Sn_xAl_yV_z)O_{4.5+1.5w}$$

where x, y, z and w take respective values within the following ranges: $0.10 \leq x \leq 0.60$, $0.00 \leq y \leq 0.20$, $0.20 \leq z \leq 0.60$, $4.88 \leq w \leq 4.92$, and an additional component of $CeO_2$ incorporated therein in an amount of not less than 0.1 wt % but not more than 0.5 wt %.

4 Claims, 2 Drawing Sheets

MAGNETIC MATERIAL FOR HIGH FREQUENCIES

BACKGROUND OF THE INVENTION

1. Field of the Invention

The present invention relates to a magnetic material for high frequencies and, more particularly, to a magnetic composition of a calcium vanadium garnet system suitable for use in a range of high frequencies such as microwaves and millimeter-waves.

2. Description of the Prior Art

As a magnetic material for high frequencies, there have been used those such as manganese-magnesium ferrites, nickel-zinc ferrites, lithium ferrites and yttrium-iron-garnets (YIG), calcium-vanadium-garnets, etc. since they have a saturation magnetization (4 $\pi$Ms) ranging from 500 to 4000 gauss. Among them, calcium-vanadium-garnets are known to be a magnetic material with a low magnetic loss which is given by a ferromagnetic resonance absorption half-line width ($\Delta$H). Thus, the calcium-vanadium-garnets make it possible to produce low-loss circuit elements such as isolators and circulators since they meet requirements for magnetic materials such that they must have not only a suitable value of 4 $\pi$Ms but a small $\Delta$H.

Japanese patent publication No. 49-15754 (i.e., JP-B-49-15754) discloses a magnetic material for microwaves of a calcium-vanadium-garnet system in which a part of Ca is replaced with Y and a part of Fe is replaced with Sn to provide a composition expressed by the general formula:

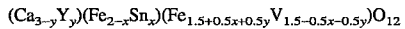

where $0<y\leq2.5$, $0<x\leq0.35y+0.3$, and $0<1.5-0.5x-0.5y$. This material has a small saturation magnetization (4 $\pi$ms), a small temperature coefficient of 4 $\pi$Ms and small $\Delta$H.

In proceeding papers, p 424, of a lecture in a national meeting of the electronics-communications society for the 47 year of Showa, it has been reported by Takamizawa et al. that substitution of Y and Sn for parts of Ca and Fe causes a variation of 4 $\pi$Ms, that a partial replacement of Fe with Sn lowers the anisotropic field and $\Delta$H.

However, such calcium-vanadium-garnet materials have a serious problem that a slight deviation of the composition causes considerable increase in both $\Delta$H and dielectric dissipation factor (tan $\delta$) and interferes with the practical uses.

On the other hand, when the magnetic material is used for self-biasing phase converting elements or latching type phase shifters, it is required to have a large ratio of remanent magnetic flux density (Br) to maximum magnetic flux density (Bm), i.e., a large squareness ratio (Br/Bm), as well as small tan $\delta$. However, the above calcium-vanadium-garnet materials cannot be applied to the phase converting elements since the greater Br/Bm, the greater is tan $\delta$, and the smaller the tan $\delta$ the smaller is Br/Bm.

SUMMARY OF THE INVENTION

Thus, the present invention has been made to overcome the aforesaid problems as well as to provide a magnetic material for high frequencies which is large in squareness ratio (Br/Bm) but small in dielectric dissipation factor (tan $\delta$), and which has a small ferromagnetic resonance absorption half-line width ($\Delta$H) and a desired value of 4 $\pi$Ms controlled within a certain range.

DETAILED DESCRIPTION OF THE INVENTION

The above and other objects are solved by incorporating a certain amount of cerium oxide ($CeO_2$) into a magnetic composition of a calcium-vanadium-garnet system in which a part of Ca is replaced with Y and a part of Fe is replaced with Sn singly or together with Al. Thus, there is provided a magnetic material for high frequencies consisting essentially of a main component of a calcium-vanadium-garnet system of the kind wherein a part of Ca is replaced with Y and a part of Fe is replaced with Sn singly or together with Al, and an additional component of $CeO_2$ incorporated therein.

According to the present invention, there is provided a magnetic material for high frequencies consisting essentially of a main component expressed by the general formula:

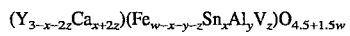

where x, y, z and w take respective values within the following ranges: $0.10\leq x\leq0.60$, $0.00\leq y\leq0.20$, $0.20\leq z\leq0.60$, $4.88\leq w\leq4.92$, and an additional component of $CeO_2$ incorporated therein in an amount of not less than 0.1 percent by weight but not more than 0.5 percent by weight.

If the main component contains no Al, i.e, y=0, a preferred composition for the main component has a composition expressed by the general formula:

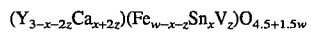

where x, z and w take respective values within the following ranges: $3.68\leq w-x-z\leq4.62$, $0.10\leq x\leq0.60$, $0.20\leq z\leq0.60$, $4.88\leq w\leq4.92$.

Similarly, if the main component contains Sn and Al, a preferred composition for the main component is expressed by the general formula:

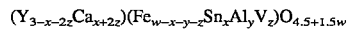

where x, y, z and w take respective values within the following ranges: $0.10\leq x\leq0.60$, $0.00<y\leq0.20$, $0.20\leq z\leq0.60$, $4.88\leq w\leq4.92$.

The reasons why the magnetic material of the present invention has been limited to those having a composition defined as above are as follows:

If a molar fraction of Sn, i.e., x is less than 0.10, or if x is more than 0.60, $\Delta$H becomes large. Thus, x has been limited to a value ranging from 0.10 to 0.60 inclusive.

If a molar fraction of Al, i.e., y is more than 0.20, Br becomes small, and thus Br/Bm becomes lowered. Thus, y has been limited to a value equal to or less than 0.20.

If a molar fraction of V, i.e., z is less than 0.20, or if z exceeds 0.60, $\Delta$H becomes large. Thus, z has been limited to a value ranging from 0.20 to 0.60 inclusive.

If w is less than 4.88, Br becomes small, and thus Br/Bm becomes lowered. If w is more than 4.92, tan $\delta$ becomes large. Thus, w has been limited to a value ranging from 4.88 to 4.92 inclusive.

Cerium oxide has been incorporated into the main component to lower the dielectric dissipation factor (tan $\delta$). However, if the amount of $CeO_2$ is less than 0.1 wt %, tan $\delta$ is scarcely improved. If the amount of $CeO_2$ is more than 0.5 wt %, $\Delta$H becomes large. For these reasons, the amount of $CeO_2$ has been limited to a value ranging from 0.1 to 0.5 wt % inclusive.

The magnetic material of the present invention has a large squareness ratio (Br/Bm), a small dielectric dissipation factor (tan δ), a small ferromagnetic resonance absorption half-line width (ΔH), a desired value saturation magnetization (4 πMs) ranging from 860 to 1430 gauss, and a small dielectric dissipation factor (tan δ).

These and other objects, features and advantages of the present invention will be further apparent from the following descriptions with reference to the examples.

EXAMPLE 1

Firstly, there were prepared highly purified $Y_2O_3$, $CaCO_3$, $Fe_2O_3$, $SnO_2$, $V_2O_5$ and $CeO_2$ as raw materials. These raw materials were weighed and mixed in proportions shown in Table 1, and milled by the wet process for 16 hours with a ball mill. After drying, the resultant mixture was calcined at 1050° C. for 2 hours, crushed and then ground along with an organic binder by the wet process for 16 hours with a ball mill. The resultant calcined powder was dried, passed through a 50 mesh sieve to obtain minus sieve. The resultant granulated powder was compacted into square rods with size of 5 mm by 5 mm by 20 mm, disks with a 10 mm diameter and a 1 mm thick, and rings with an outer diameter of 36 mm, an inner diameter of 24 mm and a thickness of 6 mm under a pressure of 2000 Kg/cm². The resultant three kinds of green compacts were fired at a temperature of 1300° to 1360° C. for 8 hours to prepare sintered bodies.

The resultant square ceramic rods were machined to prepare spherical specimens with a diameter of 2 mm and columnar specimens with a diameter of 1.3 mm and a length of 16 mm. Using the spherical specimens, the saturation magnetization (4 πMs) was measured with a vibrating sample magnetometer. Using the columnar specimens, dielectric dissipation factor (tan δ) was measured at 10 GHz with a TM101 mode cavity resonator by the perturbation method.

The resultant ceramic disks were machined to prepare disk specimens with a diameter of 7 mm and a thickness of 0.3 mm. The specimen was placed in a resonator with λ/2 strip lines to determine ferromagnetic resonance absorption half-line width (ΔH) at 1 GHz.

Using the ceramic rings, there were prepared ring transformers with bifilar toroidal coils of 30 turns by winding two copper wires round the ring. For each specimen, remanent magnetic flux density (Br) and maximum magnetic flux density (Bm) were measured at 100 Hz.

Figure 1:
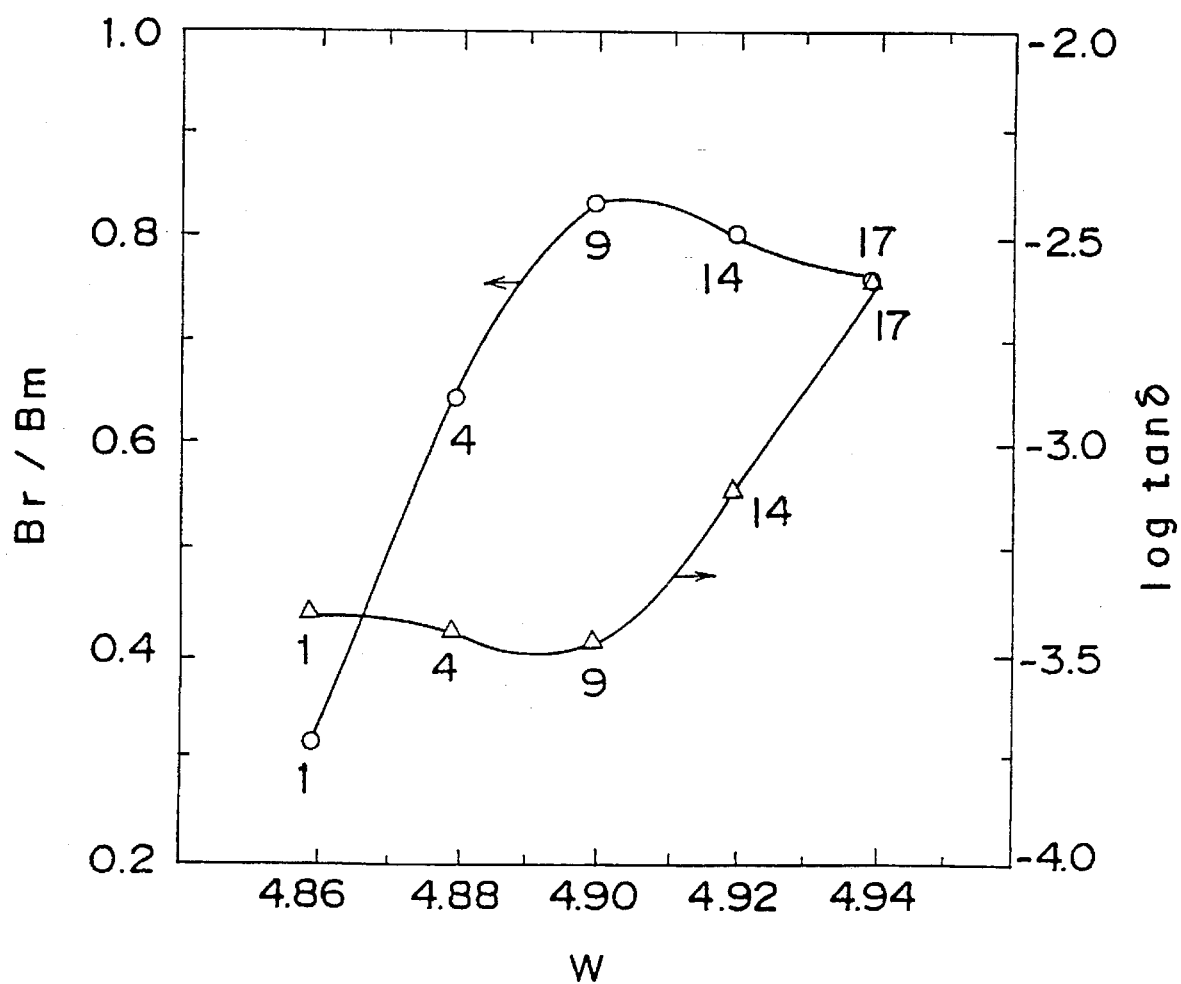
FIG. 1 is a graph illustrating influences of w on electrical properties (Br/Bm) and log (tan δ) of calcium-vanadium-garnet material.

The results are shown in Table 1 in which specimens with an asterisk (*) are those out of the scope of the present invention, while other specimens are those falling within the scope of the present invention. Also, the values of Br/Bm and tan δ for specimens No. 1, 4, 9, 14 and 17 are plotted in FIG. 1 as a function of w in the system $$(Y_{3-x-2z}Ca_{x+2z})(Fe_{w-x-z}Sy_xV_z)O_{4.5+1.5w}+CeO_2.$$

In this figure, the data for the dielectric loss are plotted by taking the common logarithm of dielectric dissipation factor (tan δ) and numerals corresponds to the respective specimen numbers.

TABLE 1

| No. | $(Y_{3-x-2z}Ca_{x+2z})(Fe_{w-x-z}Sn_xV_z)O_{4.5+1.5w}$ 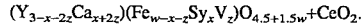 | | | | $CeO_2$ (wt %) | 4πMs (gauss) | ΔH (Oe) | tan δ (× 10⁻⁴) | Br (gauss) | Br/Bm |
|---|---|---|---|---|---|---|---|---|---|---|
| | w-x-z | x | z | w | | | | | | |
| 1* | 4.16 | 0.30 | 0.40 | 4.86 | 0.2 | 1090 | 10 | 4.0 | 270 | 0.32 |
| 2* | 4.18 | 0.30 | 0.40 | 4.88 | 0.05 | 1170 | 8 | 25.1 | 560 | 0.64 |
| 3 | 4.18 | 0.30 | 0.40 | 4.88 | 0.1 | 1170 | 9 | 9.4 | 570 | 0.65 |
| 4 | 4.18 | 0.30 | 0.40 | 4.88 | 0.2 | 1180 | 9 | 3.7 | 580 | 0.65 |
| 5 | 4.18 | 0.30 | 0.40 | 4.88 | 0.5 | 1180 | 12 | 4.1 | 580 | 0.65 |
| 6* | 4.18 | 0.30 | 0.40 | 4.88 | 1.0 | 1170 | 30 | 5.8 | 600 | 0.67 |
| 7* | 4.20 | 0.30 | 0.40 | 4.90 | 0.05 | 1140 | 7 | 22.1 | 780 | 0.83 |
| 8 | 4.20 | 0.30 | 0.40 | 4.90 | 0.1 | 1150 | 7 | 8.1 | 780 | 0.83 |
| 9 | 4.20 | 0.30 | 0.40 | 4.90 | 0.2 | 1160 | 7 | 3.5 | 800 | 0.84 |
| 10 | 4.20 | 0.30 | 0.40 | 4.90 | 0.5 | 1160 | 10 | 3.6 | 800 | 0.84 |
| 11* | 4.20 | 0.30 | 0.40 | 4.90 | 1.0 | 1160 | 31 | 4.2 | 800 | 0.85 |
| 12* | 4.22 | 0.30 | 0.40 | 4.92 | 0.05 | 1150 | 8 | 24.9 | 730 | 0.79 |
| 13 | 4.22 | 0.30 | 0.40 | 4.92 | 0.1 | 1150 | 9 | 9.8 | 730 | 0.79 |
| 14 | 4.22 | 0.30 | 0.40 | 4.92 | 0.2 | 1150 | 9 | 7.9 | 750 | 0.81 |
| 15 | 4.22 | 0.30 | 0.40 | 4.92 | 0.5 | 1160 | 14 | 7.2 | 750 | 0.81 |
| 16* | 4.22 | 0.30 | 0.40 | 4.92 | 1.0 | 1160 | 28 | 7.6 | 770 | 0.83 |
| 17* | 4.24 | 0.30 | 0.40 | 4.94 | 0.2 | 1130 | 11 | 25.5 | 670 | 0.77 |
| 18* | 4.48 | 0.02 | 0.40 | 4.90 | 0.2 | 820 | 40 | 5.2 | 500 | 0.79 |
| 19 | 4.40 | 0.10 | 0.40 | 4.90 | 0.2 | 1030 | 14 | 4.4 | 660 | 0.80 |
| 20 | 4.20 | 0.30 | 0.40 | 4.90 | 0.2 | 1160 | 7 | 3.5 | 800 | 0.84 |
| 21 | 3.90 | 0.60 | 0.40 | 4.90 | 0.2 | 1120 | 9 | 3.5 | 740 | 0.81 |
| 22* | 3.50 | 1.00 | 0.40 | 4.90 | 0.2 | 1090 | 33 | 4.0 | 710 | 0.80 |
| 23* | 4.55 | 0.30 | 0.05 | 4.90 | 0.2 | 1620 | 35 | 3.2 | 1070 | 0.78 |
| 24 | 4.40 | 0.30 | 0.20 | 4.90 | 0.2 | 1430 | 10 | 3.5 | 950 | 0.81 |
| 25 | 4.20 | 0.30 | 0.40 | 4.90 | 0.2 | 1160 | 7 | 3.5 | 800 | 0.84 |
| 26 | 4.00 | 0.30 | 0.60 | 4.90 | 0.2 | 860 | 12 | 4.6 | 550 | 0.81 |
| 27* | 3.80 | 0.30 | 0.80 | 4.90 | 0.2 | 420 | 38 | 5.5 | 270 | 0.82 |

As will be understood from the data shown in Table 1, the magnetic material of the present invention is large in squareness ratio (Br/Bm) but small in the dielectric dissipation factor (tan δ). Further, the magnetic material of the present invention has a small ferromagnetic resonance absorption half-line width (ΔH) and a small dielectric dissipation factor (tan δ). In addition, the saturation magnetization (4 πMs)

ranges from 860 to 1430 gauss by a suitable variation of the molar fractions of substituents. Accordingly, the magnetic material of the present invention makes it possible to produce highly stable circuit elements for microwave and millimeter wave frequencies, such as latching type phase convertors, isolators, circulators and the like.

In contrast therewith, if w is less than 4.88 like as specimen No. 1, Br becomes small, and thus Br/Bm becomes lowered. On the other hand, if w exceeds 4.92 like as specimen No. 17, tan δ becomes more than $25.5 \times 10^{-4}$. Further, as will be understood from the results shown in FIG. 1, it is possible to produce a magnetic material with a large Br/Bm and a small tan δ only when w takes a value within the range of 4.88 to 4.92.

If a molar fraction of Sn, i.e., x is less than 0.10 like as specimen No. 18, or if x is more than 0.60 like as specimen No. 22, ΔH becomes large.

If a molar fraction of V, i.e., z is less than 0.20 like as specimen No. 23, or if z is more than 0.60 like as specimen No. 27, ΔH becomes large.

In order to meet the conditions: $4.88 \leq w \leq 4.92$, $0.10 \leq x \leq 0.60$, and $0.20 \leq z \leq 0.60$, a molar fraction of Fe, i.e., (w−x−z) should be a value ranging from 3.68 to 4.62 inclusive.

If the amount of $CeO_2$ is less than 0.1 wt %, like as specimens Nos. 2, 7 and 12, tan δ is scarcely improved. If the amount of $CeO_2$ is more than 0.5 wt %, like as specimens Nos. 6, 11 and 16, ΔH becomes large.

EXAMPLE 2

Using highly purified $Y_2O_3$, $CaCO_3$, $Fe_2O_3$, $SnO_2$, $V_2O_5$, $Al_2O_3$ and $CeO_2$ as raw materials, there were prepared specimens in the following manner. The raw materials were weighed and mixed in proportions shown in Table 2, and milled by the wet process for 16 hours with a ball mill. After drying, the resultant mixture was calcined at 1050° C. for 2 hours, crushed and then ground along with an organic binder by the wet process for 16 hours with a ball mill. The resultant calcined powder was dried, passed through a 50 mesh sieve to obtain minus sieve. The resultant granulated powder was compacted into square rods of 5 mm by 5 mm by 20 mm, disks with a diameter of 10 mm and a thick of 1 mm, and rings with an outer diameter of 36 mm, an inner diameter of 24 mm and a thickness of 6 mm under a pressure of 2000 $Kg/cm^2$. The resultant three kinds of green compacts were fired at a temperature of 1300° to 1360° C. for 8 hours to prepare sintered bodies.

The resultant square ceramic rods were machined to prepare spherical specimens with a diameter of 2 mm and columnar specimens with a diameter of 1.3 mm and a length of 16 mm. For each spherical specimen, the saturation magnetization (4 πMs) was measured with a vibrating sample magnetometer. For each columnar specimen, dielectric dissipation factor (tan δ) was measured at 10 GHz with a TM101 mode cavity resonator by the perturbation method.

The resultant ceramic disks were machined to prepare disk specimens with a diameter of 7 mm and a thickness of 0.3 mm. The specimen was placed in a resonator with strip lines of λ/2 to determine ferromagnetic resonance absorption half-line width (ΔH) at 1 GHz.

Using the ceramic rings, there were prepared ring transformers with bifilar toroidal coils of 30 turns by winding two copper wires round the ring. For each specimen, remanent magnetic flux density (Br) and maximum magnetic flux density (Bm) were measured at 100 Hz.

The results are shown in Table 2 in which specimens with an asterisk (*) are those out of the scope of the present invention, while other specimens are those falling within the scope of the present invention. Also, the values of Br/Bm and tan δ for specimens Nos. 42–46 are plotted in FIG. 2 as a function of w in the system

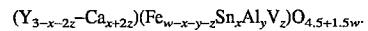

$(Y_{3-x-2z}Ca_{x+2z})(Fe_{w-x-y-z}Sn_xAl_yV_z)O_{4.5+1.5w}$.

In this figure the data for the dielectric loss are plotted by taking the common logarithm of dielectric dissipation factor (tan δ) and numerals corresponds to the respective specimen numbers.

TABLE 2

| | $(Y_{3-x-2z}Ca_{x+2z})(Fe_{w-x-y-z}Sn_xAl_yV_z)O_{4.5+1.5w}$ | | | | $CeO_2$ | 4πMs | ΔH | tan δ | Br | |
|---|---|---|---|---|---|---|---|---|---|---|
| No. | x | y | z | w | (wt %) | (gauss) | (Oe) | ($\times 10^{-4}$) | (gauss) | Br/Bm |
| 28* | 0.02 | 0.10 | 0.40 | 4.90 | 0.2 | 910 | 52 | 4.4 | 700 | 0.78 |
| 29 | 0.10 | 0.10 | 0.40 | 4.90 | 0.2 | 940 | 13 | 4.1 | 720 | 0.81 |
| 30 | 0.30 | 0.10 | 0.40 | 4.90 | 0.2 | 960 | 8 | 3.6 | 760 | 0.83 |
| 31 | 0.60 | 0.10 | 0.40 | 4.90 | 0.2 | 900 | 16 | 3.6 | 740 | 0.83 |
| 32* | 1.00 | 0.10 | 0.40 | 4.90 | 0.2 | 720 | 50 | 4.0 | 730 | 0.81 |
| 33 | 0.30 | 0.00 | 0.40 | 4.90 | 0.2 | 1160 | 7 | 3.5 | 910 | 0.84 |
| 34 | 0.30 | 0.10 | 0.40 | 4.90 | 0.2 | 960 | 8 | 3.6 | 760 | 0.83 |
| 35 | 0.30 | 0.20 | 0.40 | 4.90 | 0.2 | 670 | 10 | 4.4 | 500 | 0.79 |
| 36* | 0.30 | 0.30 | 0.40 | 4.90 | 0.2 | 460 | 16 | 6.0 | 370 | 0.35 |
| 37* | 0.30 | 0.10 | 0.05 | 4.90 | 0.2 | 1380 | 62 | 5.9 | 1090 | 0.82 |
| 38 | 0.30 | 0.10 | 0.20 | 4.90 | 0.2 | 1190 | 13 | 4.4 | 930 | 0.82 |
| 39 | 0.30 | 0.10 | 0.40 | 4.90 | 0.2 | 960 | 8 | 3.6 | 760 | 0.83 |
| 40 | 0.30 | 0.10 | 0.60 | 4.90 | 0.2 | 720 | 12 | 4.9 | 560 | 0.79 |
| 41* | 0.30 | 0.10 | 0.80 | 4.90 | 0.2 | 460 | 49 | 6.2 | 310 | 0.77 |
| 42* | 0.30 | 0.10 | 0.40 | 4.86 | 0.2 | 950 | 10 | 3.4 | 280 | 0.30 |
| 43 | 0.30 | 0.10 | 0.40 | 4.88 | 0.2 | 970 | 8 | 3.4 | 680 | 0.75 |
| 44 | 0.30 | 0.10 | 0.40 | 4.90 | 0.2 | 960 | 8 | 3.6 | 760 | 0.83 |
| 45 | 0.30 | 0.10 | 0.40 | 4.92 | 0.2 | 940 | 7 | 4.2 | 740 | 0.82 |
| 46* | 0.30 | 0.10 | 0.40 | 4.94 | 0.2 | 940 | 9 | 23.5 | 740 | 0.81 |
| 47* | 0.30 | 0.10 | 0.40 | 4.90 | 0.05 | 980 | 10 | 26.5 | 780 | 0.81 |
| 48 | 0.30 | 0.10 | 0.40 | 4.90 | 0.1 | 970 | 8 | 8.1 | 760 | 0.81 |
| 49 | 0.30 | 0.10 | 0.40 | 4.90 | 0.2 | 960 | 8 | 3.6 | 760 | 0.83 |
| 50 | 0.30 | 0.10 | 0.40 | 4.90 | 0.5 | 960 | 16 | 3.6 | 750 | 0.82 |

TABLE 2-continued

| No. | $(Y_{3-x-2z}Ca_{x+2z})$ x | $(Fe_{w-x-y-z}Sn_xAl_yV_z)O_{4.5+1.5w}$ y | z | w | $CeO_2$ (wt %) | $4\pi Ms$ (gauss) | $\Delta H$ (Oe) | $\tan \delta$ $(\times 10^{-4})$ | Br (gauss) | Br/Bm |
|---|---|---|---|---|---|---|---|---|---|---|
| 51* | 0.30 | 0.10 | 0.40 | 4.90 | 1.0 | 960 | 52 | 4.2 | 750 | 0.80 |

Figure 2:
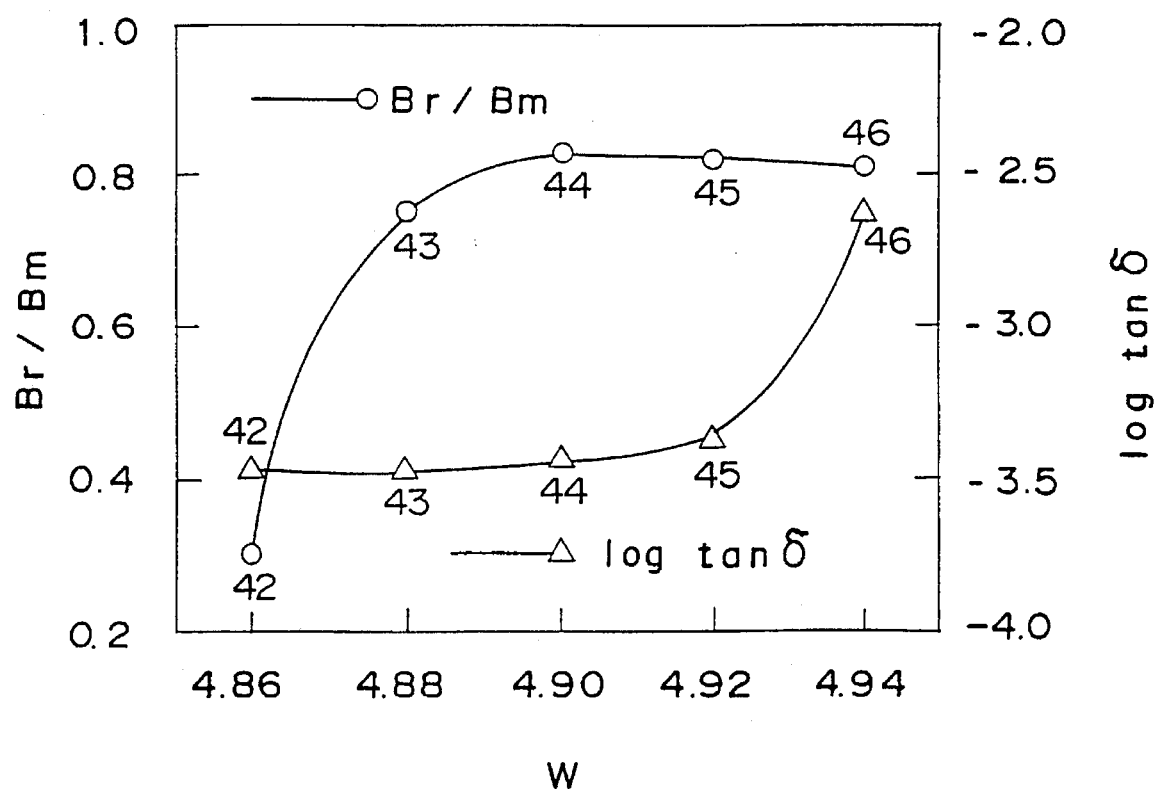
FIG. 2 is a graph similar to FIG. 1 and illustrating additional data.

As will be understood from the results shown in FIG. 2, the magnetic material possesses a large Br/Bm and a small tan δ only when w takes a value within the range of 4.88 to 4.92 inclusive.

Further, from the data shown in Table 2, it will be seen that the magnetic material of the present invention is large in squareness ratio (Br/Bm) but small in the dielectric dissipation factor (tan δ), and has a small ferromagnetic resonance absorption half-line width (ΔH) and a small dielectric dissipation factor (tan δ). In addition, it will be seen that the present invention enables to obtain a magnetic material with a saturation magnetization (4 πMs) ranging from 860 to 1430 gauss by a suitable variation of the molar fractions of substituents. Accordingly, the magnetic material of the present invention makes it possible to produce highly stable circuit elements for microwave and millimeter wave frequencies, such as latching type phase convertors, isolators, circulators and the like.

What is claimed is:

1. A magnetic material for high frequencies consisting essentially of a main component which contains Sn and Al and has a composition expressed by the general formula:

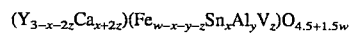

$(Y_{3-x-2z}Ca_{x+2z})(Fe_{w-x-y-z}Sn_xAl_yV_z)O_{4.5+1.5w}$ where x, y, z and w take respective values within the following ranges: $0.10 \leq x \leq 0.60$, $0.00 < y \leq 0.20$, $0.20 \leq z \leq 0.60$, $4.88 \leq w \leq 4.92$, and an additional component of $CeO_2$ incorporated therein in an amount of not less than 0.1 percent by weight but not more than 0.5 percent by weight.

2. The magnetic material for high frequencies according to claim 1 in which y is at least 0.10.

3. The magnetic material for high frequencies according to claim 2 in which x is 0.30 and z is 0.40.

4. A magnetic material for high frequencies consisting essentially of a main component of a calcium-vanadium-garnet system wherein a part of Ca is replaced with Y and a part of Fe is replaced with Sn and Al, and an additional component of $CeO_2$ incorporated therein in an amount of not less than 0.1% by Weight but not more than 0.5% by weight.

* * * * *